United States Patent [19]

Wataya

[11] Patent Number: 4,933,862
[45] Date of Patent: Jun. 12, 1990

[54] ENGINE CONTROL APPARATUS

[75] Inventor: Seiji Wataya, Hyogo, Japan

[73] Assignee: Mitsubishi Denki Kabushiki Kaisha, Tokyo, Japan

[21] Appl. No.: 159,090

[22] Filed: Feb. 23, 1988

[30] Foreign Application Priority Data

Feb. 23, 1987 [JP] Japan .................................. 62-40961

[51] Int. Cl.$^5$ ...................... F02D 41/24; F02D 41/40; G06F 15/16
[52] U.S. Cl. .............................. 364/431.06; 123/480; 364/131
[58] Field of Search .................... 364/431.05, 431/06, 364/131; 123/417, 480, 486

[56] References Cited

U.S. PATENT DOCUMENTS

| | | | |
|---|---|---|---|
| 4,282,573 | 8/1981 | Imai et al. | 364/431.11 |
| 4,363,097 | 12/1982 | Amano et al. | 364/431.11 |
| 4,424,568 | 1/1984 | Nishimura et al. | 364/431.05 |
| 4,428,348 | 1/1984 | Takase et al. | 364/431.05 |
| 4,478,185 | 10/1984 | Obayashi et al. | 123/417 |
| 4,512,317 | 4/1985 | Pauwels et al. | 123/490 |
| 4,532,592 | 7/1985 | Citron et al. | 364/431.07 |

Primary Examiner—Felix D. Gruber
Attorney, Agent, or Firm—Sughrue, Mion, Zinn, Macpeak & Seas

[57] ABSTRACT

As engine control apparatus for electrically controlling a fuel and ignition timing for a multicylinder 4-cycle engine comprises a plurality of first micro-computer each being provided for every one of or for every pair of cylinders in which compression and exhaust strokes are in phase, and a second micro-computer which is arranged to communicate with each first micro-computer. The first micro-computer calculates a fundamental quantity of fuel injection from a rotational signal and a load signal of the engine, a correction quantity according to correction control information from the second micro-computer, and controls the operation of a fuel injection valve, the ignition timing from the rotational signal and load signal, a correction quantity according to correction control information from the second micro-computer, and controls the on/off operation of ignition coils according to the ignition timing. The second micro-computer calculates a quantity of correction of said fuel and a quantity of correction of the ignition timing from at least one of parameters including an engine speed, an engine load condition, an engine temperature, atmospheric pressure, and an output of an oxygen sensor.

8 Claims, 7 Drawing Sheets

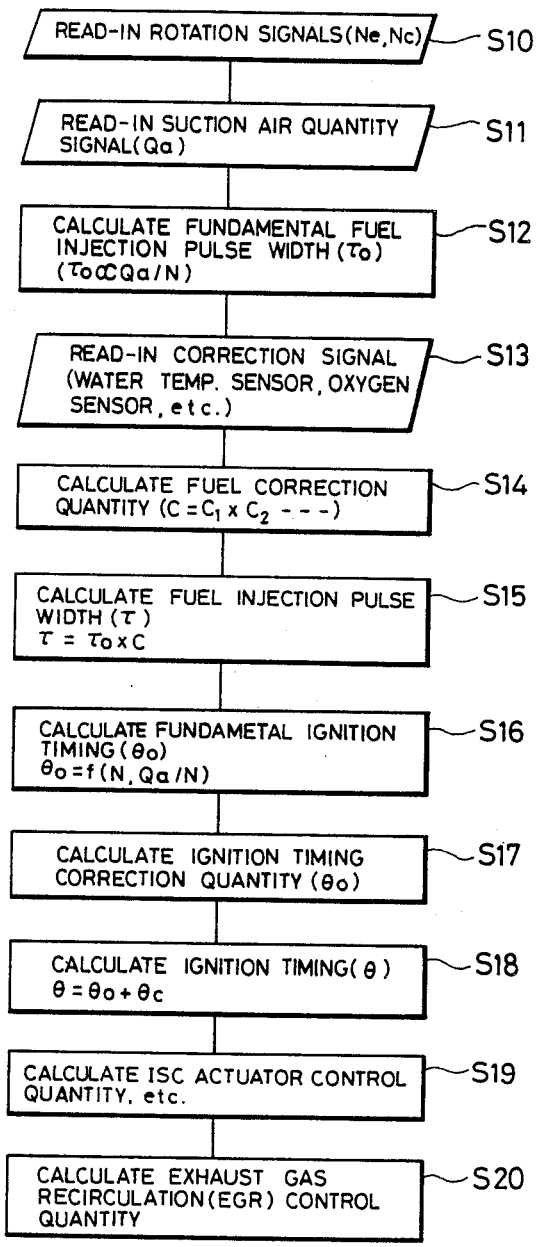

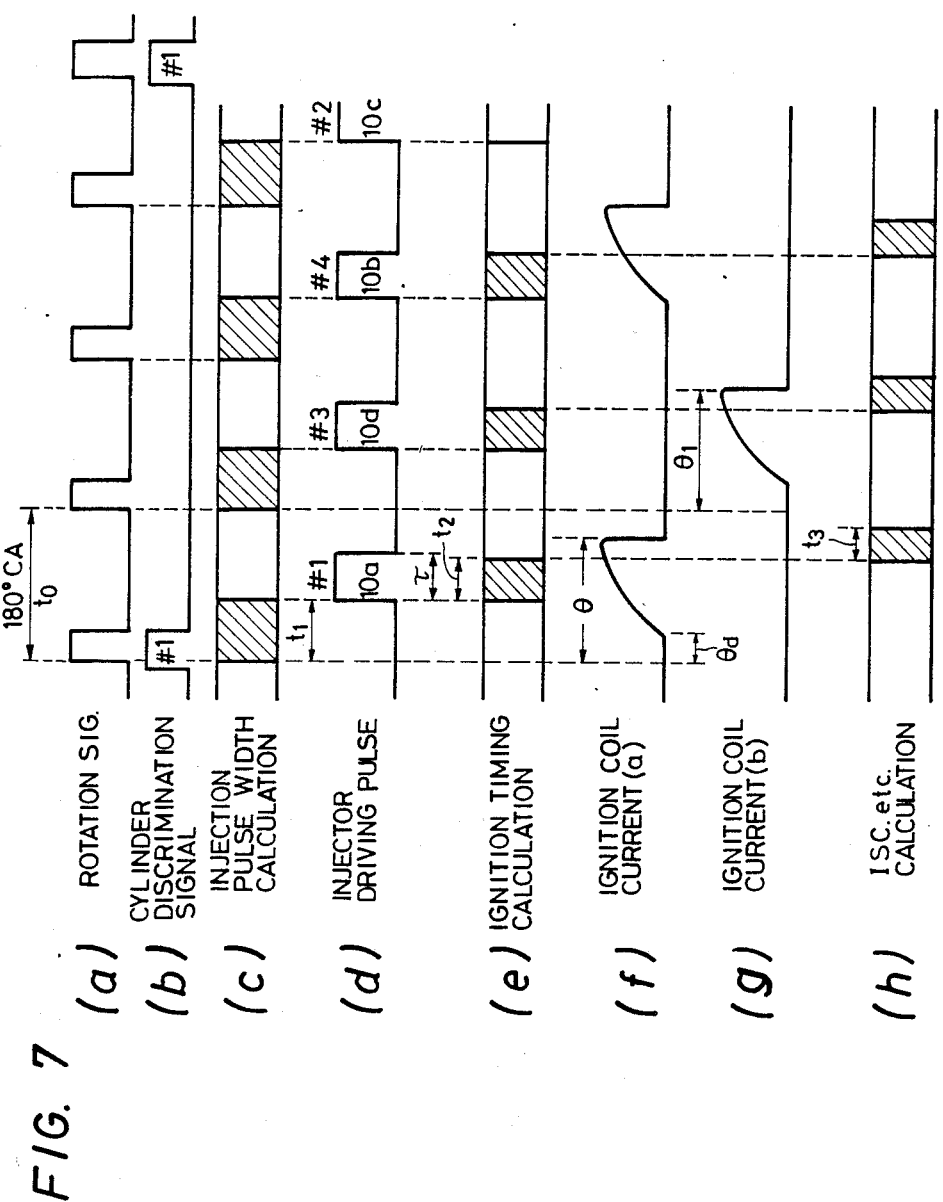

ENGINE CONTROL APPARATUS

BACKGROUND OF THE INVENTION

1. Field of the Invention

The present invention generally relates to an engine control apparatus for controlling the fuel injection, the ignition timing, etc., by using a microcomputer in an engine of a car, and particularly to an engine control apparatus for increasing a calculating speed so as to cope with a high-speed revolution of an engine.

2. Description of the Prior Art

In the field of car engine, a method of electronically accurately controlling the quantity of fuel injection and the ignition timing of an engine by employing a microcomputer has been widely used in order to purify an exhaust gas, reduces fuel expenses and improve operating performance. FIG. 4 is a block diagram showing the arrangement of a practical example for executing such a conventional engine control method described above, and for explaining the operation of the same.

In FIG. 4, there are provided various sensors 1-6 for detecting operation conditions of an engine (not shown), that is, a rotation sensor 1, a cylinder discrimination sensor 2, an air-flow sensor 3, a water temperature sensor 4, an idle switch 5, and an air-conditioner switch 6. The rotation sensor 1 is arranged to generate a pulse signal at a predetermined crank angle of the engine.

The cylinder discrimination sensor 2 is arranged to detect a predetermined rotational angle of a cam shaft of the engine. The air-flow sensor 3 is arranged to detect the quantity of suction air of the engine, and represented, for example, by air-flow sensor of a Karman vortex type, and of a hot-wire type.

The water temperature sensor 4 is arranged to detect a temperature of the engine. The idle switch 5 is arranged to operate when a driver's foot is removed from an accelerator pedal, and the air-conditioner switch 6 is arranged to represent an operating condition of an air conditioner provided in a vehicle.

The respective output signals of the rotation sensor 1, the cylinder discrimination sensor 2, the airflow sensor 3, the water temperature sensor 4, the idle switch 5, and the air-conditioner switch 6 are applied to a microcomputer 8 through an input circuit 7. The input circuit 7 is arranged to perform level conversion and filtering of the respective output signals of those sensors.

The microcomputer 8 is arranged to calculate the quantity of fuel injection, the ignition timing, and the quantity of control of an idle rotational speed control (ISC) actuator 12 on the basis of the foregoing input signals. FIG. 5 shows the internal arrangement of the microcomputer 8.

In FIG. 5, the microcomputer 8 is provided with a microprocessor 82 for taking-in various input signals through an input port 81 so as to execute calculation on the basis of a calculation procedure stored in an ROM (read only memory) 83 in advance, an RAM (random access memory) 84 for temporarily storing data obtained by calculation and a timer 85 for measuring a pulse period of the rotation sensor 1 and for generating a driving pulse width for injectors 10a-10d of FIG. 4.

The results of calculation of the micro-processor 82 are sent to an output port 86. Pulse signals sent through the output port 86 are amplified by an output circuit 9 in FIG. 4 so as to control the driving period and driving pulse width for the injectors 10a-10d and so as to control the on/off timing for ignition coils 11a and 11d.

In this example, four injectors are respectively correspondingly provided for four suction air pipes of a 4-cylinder engine so as to be driven separately from each other, and one ignition coil is provided for each pair of the four cylinders in which the compression and exhaust strokes are produced in phase, so that each pair of the four cylinders are ignited simultaneously.

In addition to the foregoing control of the quantity of fuel injection and the ignition timing which is the fundamental engine control, the driving pulses for the ISC actuator 12 for controlling the quantity of suction air of the engine in accordance with a water temperature and various load conditions and for a solenoid valve 13 for controlling the quantity of exhaust gas re-circulation (EGR) are controlled by the microcomputer 8 in the same manner as the case of the foregoing control.

In the thus arranged engine control apparatus, operation is executed in accordance with the flowchart of FIG. 6. In FIG. 6, a pulse $N_e$ generated by the rotation sensor 1 and a pulse $N_c$ (a cylinder discrimination signal of the diagram (b) of FIG. 7) generated by the cylinder discrimination signal 2 are read-in in a step S10, and a signal $Q_a$ of the air-flow sensor 3 is read-in in a step S11. A period of the pulse of the rotation sensor 1 is measured so as to obtain the engine speed N, and the quantity of fuel required per stroke, that is, a fundamental fuel injection pulse width $\tau_0 (= Q_a/N)$, is calculated in a step S12.

Signals, for example, an output signal of the water temperature sensor 4 representing a temperature of the engine, an output signal of an oxygen sensor (not shown) for detecting an exhaust gas component, an output signal of an atmospheric pressure sensor (not shown), and the like, which moderately change, are readin in a step S13.

The quantities of correction ($C_1$, $C_2$,...) stored in the ROM 83 in advance are read out correspondingly to those correction input signals, and the total correction coefficient $C = C_1 \times C_2 \times ...$ is obtained by an operation of interpolation in the step S14.

The fundamental fuel injection pulse width $\tau$ which has been already calculated is multiplied by the correction coefficient C to thereby determine a pulse width for actually driving the injectors 10a-10d in a step S15.

As shown in FIG. 7, the injectors 10a-10d are driven by the pulse width $\tau$ (the diagram (C) of FIG. 7) by using the rotation of the engine, that is, the output signal (the diagram (a) of FIG. 7) of the rotation sensor 1 as a reference of triggering.

Among various values of the ignition timing $\theta$ stored in advance in the form of a map in the ROM 83 with respect to various values of two parameters, the engine speed N and the engine load condition ($Q_a/N$), a proper value is read out so as to obtain a fundamental ignition timing $\theta_0$ through operation of interpolation in a step S16.

The quantity of ignition timing correction $\theta_c$ is calculated correspondingly to the engine temperature and existence of an idle state of engine in a step S17, and an actual ignition timing, that is, a timing for cutting-off a current flowing in the ignition coil 11a/11b, is obtained in a step S18.

An initiation timing $\theta_d$ of current-conduction of the ignition coil 11a/11b is controlled so that a period of time $(\theta - \theta_d)$ is always substantially constant, that is, the ignition coil 11a/11b is controlled so as to make $\theta_d$ (a phase angle) shorter as the engine speed becomes higher.

After the control of the fuel injection and the ignition timing has been executed in the foregoing steps S10-S18, the quantity of control of the ISC actuator is calculated on the basis of the on/off state of the air-conditioner load and the engine temperature in a step S19. Further, if necessary, variable valves for an EGR system and a suction air system are controlled in a step S20.

In the conventional engine control apparatus, as described above, all the operations required for the control of the fuel injection pulse width, the on/off-control of the ignition coil (the diagrams (f) and (g) in FIG. 7), the control of the ISC actuator, and the like, have been executed by a single microcomputer 8.

As shown in FIG. 7, generally, the operation by a microcomputer is carried out such that the injection pulse width (the diagram (c) of FIG. 7) is calculated in a period of time $t_1$ by using the rotational signal (the diagram (a) of FIG. 7) as a trigger signal and the injector driving pulse width $\tau$(the diagram (d) of FIG. 7) is determined on the basis of results of the above calculation.

Next, the ignition timing is calculated in a period of time $t_2$ as shown in the diagram (e) of FIG. 7, and results of calculation are used as the actual ignition timing on the basis of the succeeding rotational signal.

Further, the calculation for the idle rotational speed control and EGR control is carried out in a period of time $t_3$ (the diagram (h) of FIG. 7). The sum of the time $t_1$, $t_2$, and $t_3$ required for the calculation reaches several msec., and in a 4-cylinder engine, calculation time reaches a value approximate to a limit because the p[period ($t_0$)] of the rotational signal is 5 msec. at 6000 rpm. Therefore, it has been difficult that the conventional control apparatus copes with a high engine speed of 7000-9000 rpm.

SUMMARY OF THE INVENTION

It is therefore an object of the present invention to solve the foregoing problems in the prior art.

It is another object of the present invention to provide an engine control apparatus for shortening time taken for calculation so as to cope with a high engine speed.

In the engine control apparatus according to the present invention, a microcomputer is provided for every cylinder or for every pair of cylinders for performing rear-time control of fuel injection and ignition of a multi-cylinder engine.

According to the present invention, among the fuel and ignition control, the operation of correction signals which change moderately, the idle rotational speed control, the EGR control, and the like, are performed by one microcomputer.

BRIEF DESCRIPTION OF THE DRAWINGS

The present invention will be apparent from the following detailed description taken conjunction with the accompanying drawings in which:

FIG. 6 is a flowchart for explaining the operation of the conventional engine control apparatus; and FIG. 7a to 7h are time charts for explaining the operation of the conventional one.

Figure 1:
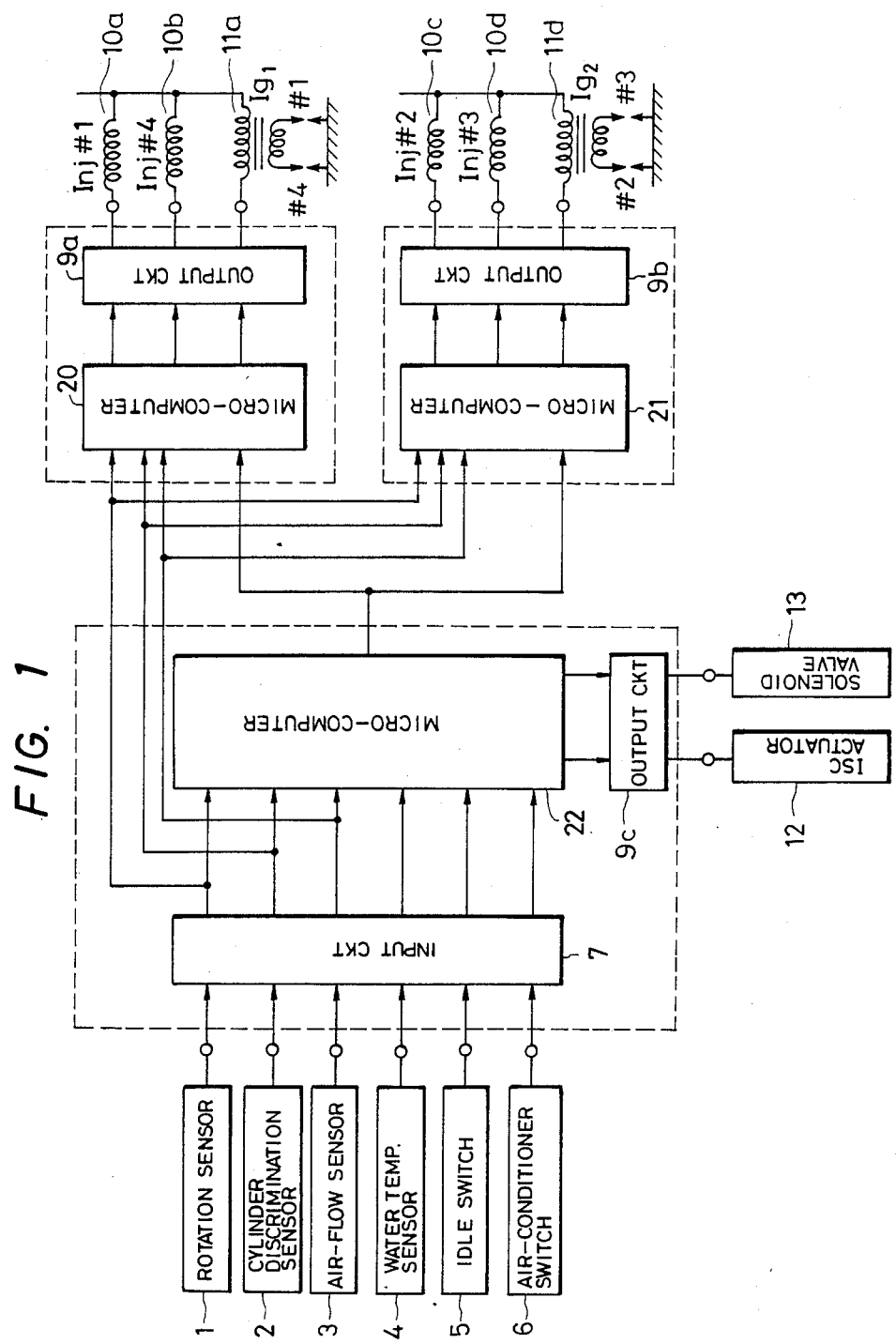
FIG. 1 is a block diagram showing the whole arrangement of an embodiment of a engine control apparatus according to the present invention.

In the drawings, parts the same with or equivalent to each other are referenced correspondingly.

DETAILED DESCRIPTION OF THE PREFERRED EMBODIMENT

Figure 4:
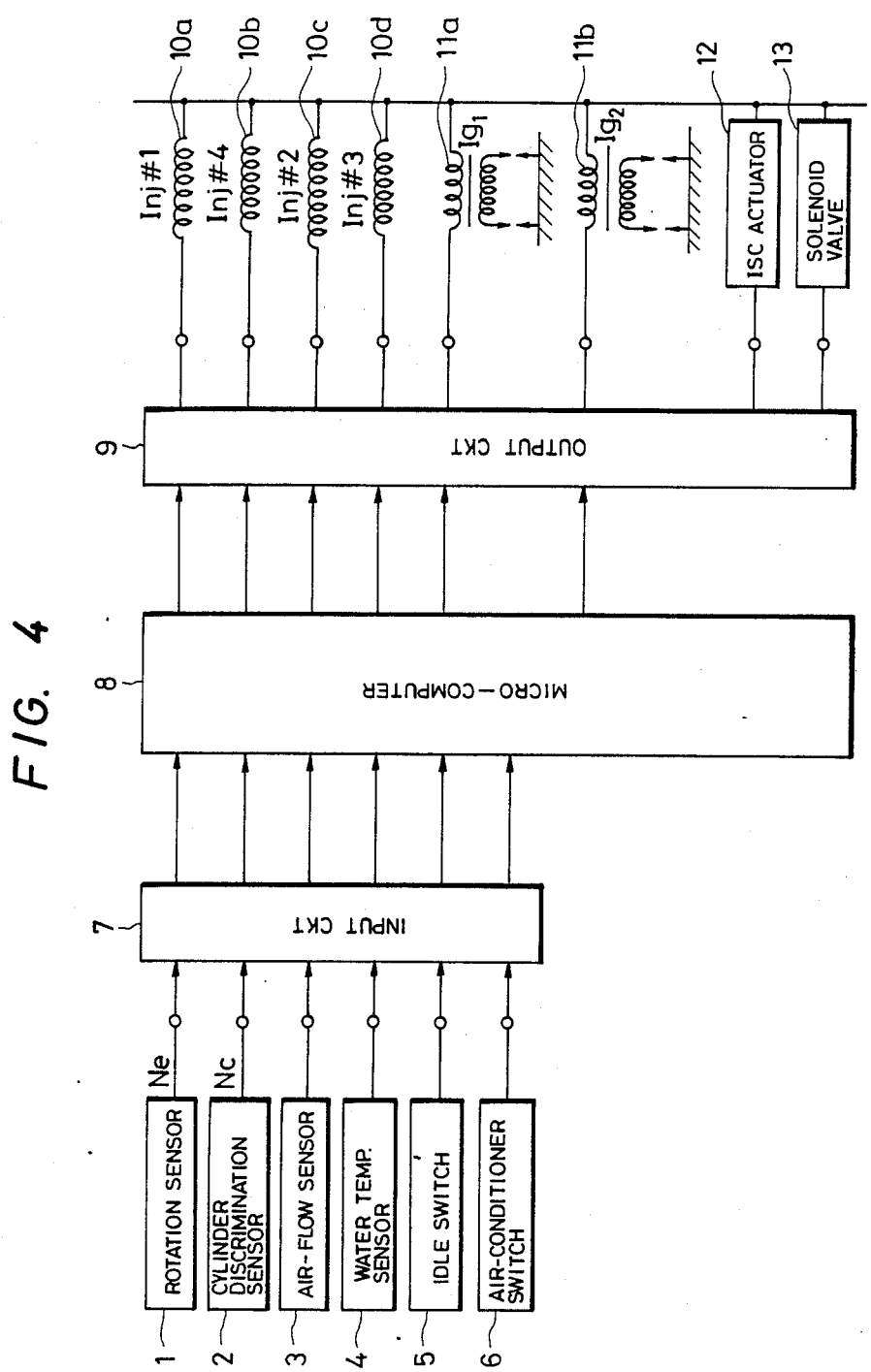
FIG. 4 is a block diagram showing the conventional engine control apparatus.
Figure 5:
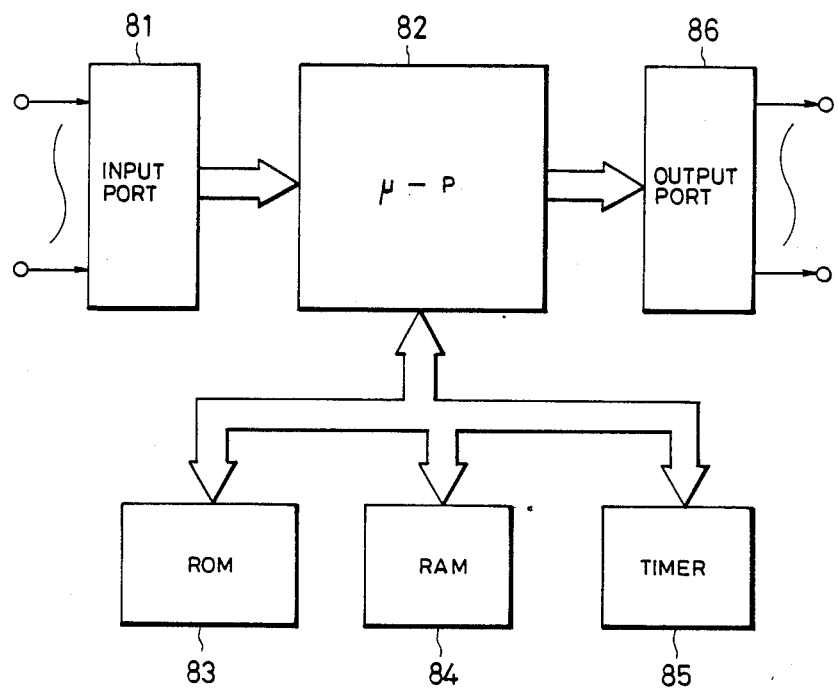
FIG. 5 is a block diagram showing the internal arrangement of the microcomputer used in the engine control apparatus according to the present invention as well as in the conventional one.

An embodiment of the engine control apparatus according to the present invention will be described hereunder with reference to the accompanying drawings. FIG. 1 is a block diagram showing the whole arrangement of the embodiment of the present invention. In this embodiment, the present invention is applied to a 4-cylinder 4-cycle engine. In FIG. 1, similarly to the conventional case of FIG. 4, there are provided a rotation sensor 1, a cylinder discrimination sensor 2, an air-flow sensor 3, a water temperature sensor 4, an idle switch 5, and an air-conditioner switch 6 which generates input signals, and injectors 10a-10d for fuel injection, ignition coils 11a and 11b for generating ignition energy, an ISC actuator 12, and a solenoid valve 13.

A microcomputer 20 is arranged to control fuel injection and ignition of the first and fourth cylinders, and on the other hand another microcomputer 21 is arranged to control fuel injection and ignition of the second and third cylinders.

The output of an input circuit 7 is supplied to the microcomputers 20 and 21 and to a further microcomputer 22. The microcomputer 22 is arranged to transmit the quantity of fuel correction as well as the quantity of ignition timing correction to the microcomputers 20 and 21, and to control the ISC actuator 12 and the solenoid valve 13 through an output circuit 9c. The respective outputs of the various sensors are supplied to the microcomputer 22 through the input circuit 7.

The respective outputs of the microcomputers 20 and 21 are applied to output circuits 9a and 9b respectively. The injectors 10a and 10b, and the ignition coil 11a are driven on the basis of the output of the output circuit 9a.

The injectors 10c and 10d and the ignition coil 11b, on the other hand, are driven on the basis of the output of the output circuit 9b. Secondary coils of the ignition coils 11a and 11b are respectively connected to ignition plugs.

Figure 2:
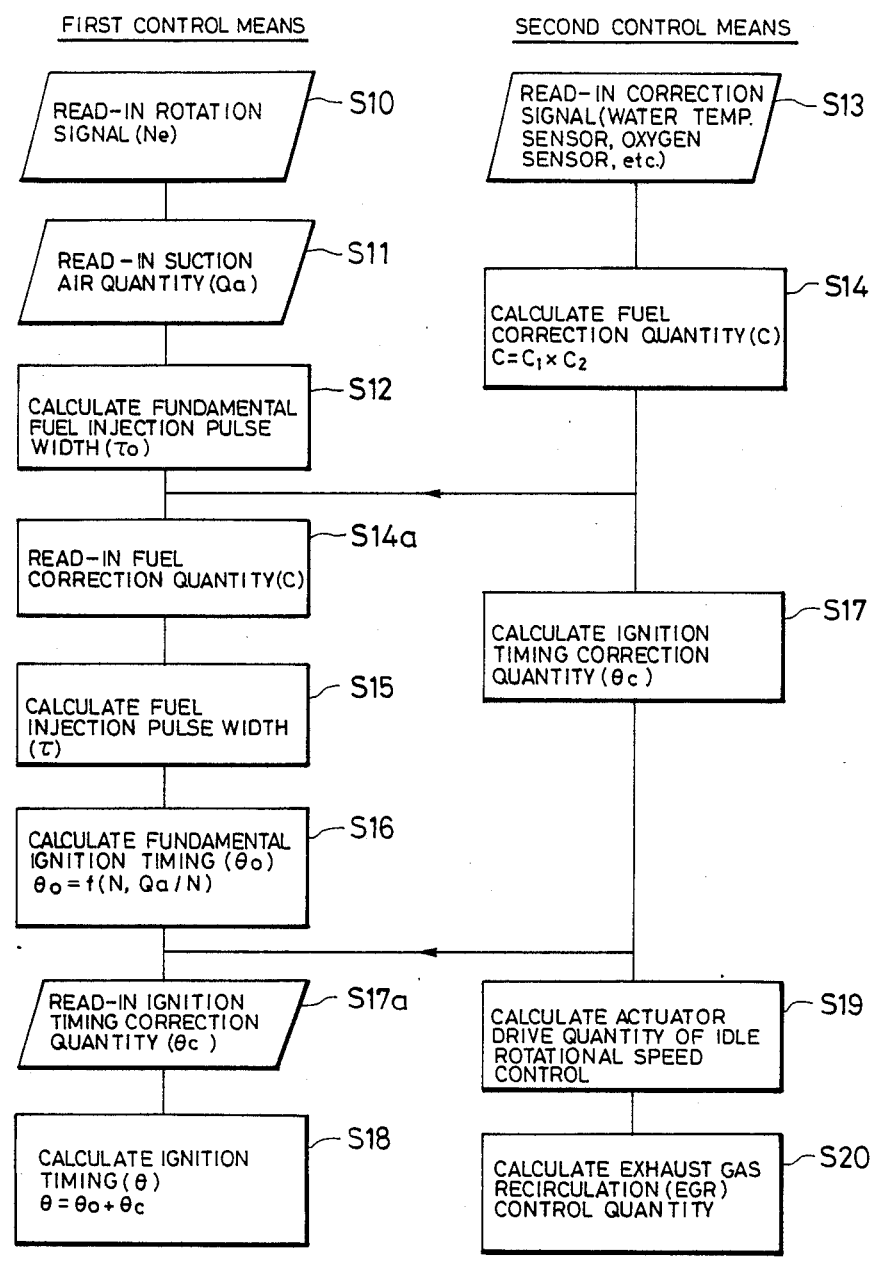
FIG. 2 is a flowchart for explaining the operation of the embodiment.

Next, the operation of the embodiment will be described. The microcomputers 20-22 operate in accordance with the flowchart of FIG. 2. In FIG. 2, a first control means represents the microcomputers 20 and 21, and a second control means represents the microcomputer 22. Further, the contents of operation of the microcomputers 20 and 21 are the same with each other except that they are different in operation timing. Accordingly, description will be made as to the operation of only the microcomputer 20 as a representative example.

The contents of operational processing in any step of FIG. 2 are the same as those in the step referenced correspondingly to the step of FIG. 2 in the conventional example of FIG. 6.

Figure 3:
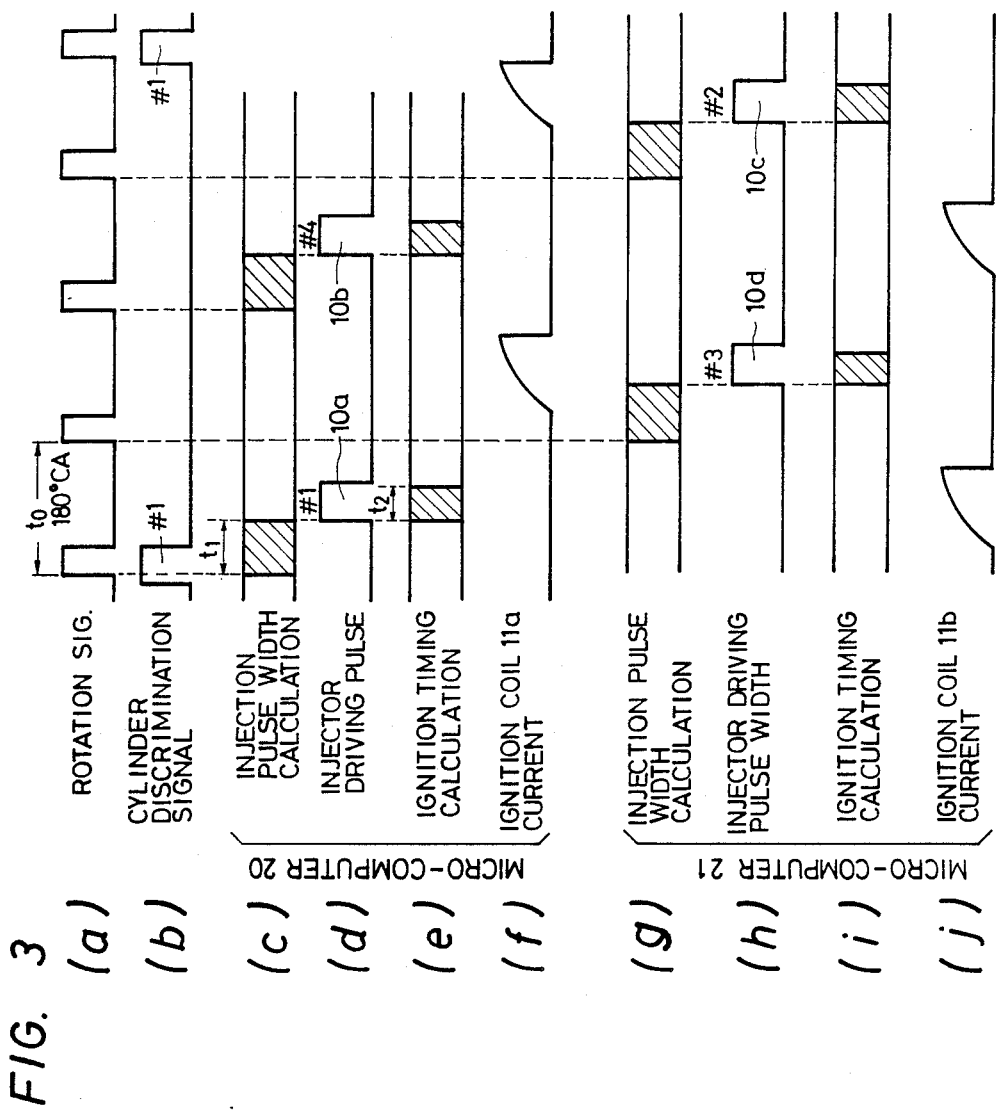
FIG. 3a to 3j are time-charts for explaining operation of the embodiment.

The microcomputer 22 takes in a pulse (the diagram (b) of FIG. 3) produced from the rotation sensor 1, and the microcomputer 20 takes in a rotational signal $N_e$ (the diagram (a) of FIG. 3) in a step S10. Further, the microcomputer 20 takes in the suction air quantity $Q_a$ in a step S11 so as to calculate a fundamental fuel injection pulse width $\tau_0$ in a step S12. The microcomputer 22 calculates the fuel correction quantity C in a step S14 on the basis of moderately changing input information such as an engine temperature, an output of an oxygen sensor, and the like taken in in a step S13. The microcomputer 20 takes in the fuel correction quantity C in a step S14a so as to calculate a fuel injection pulse width $\tau$ (the diagram (c) of FIG. 3) in a step S15.

Next, the microcomputer 20 reads data out of a map which has been stored in a ROM in advance on the basis of the engine speed N and the engine load $Q_a/N$ as parameters so as to calculate a fundamental ignition timing $\theta_0$ through operation of interpolation in a step S16.

The microcomputer 22, on the other hand, calculates the ignition timing correction quantity on the basis of the engine temperature in a step S17. The microcomputer 20 reads the correction quantity in a step S17a so as to obtain an actual ignition timing $\theta$ of the diagram (e) as shown in FIG. 3 in a step S18 to thereby supply a injector driving pulse (the diagram (d) of FIG. 3) to the output circuit 9a.

The microcomputer 22 further carries out operation for idle rotational speed control in a step S19 and operation for EGR control in a step S20, and if necessary, carries out control for another actuator, fault diagnosis of the input signal, and so on. The diagrams (g)–(i) of FIG. 3 are time-charts for explaining the operation of the microcomputer 21. Those time-charts (g)–(i) of FIG. 3 correspond to the diagrams (c)–(j) of FIG. 3.

As described above, since control is allotted between the microcomputers 20 and 21 so that the fuel injection and the ignition timing of the first and fourth cylinders are controlled by the microcomputer 20 and the fuel injection and the ignition timing of the second and third cylinders are controlled by the microcomputer 21, the Sum $(t_1+t_2)$ of the operation time is smaller than the sum $(t_1+t_2+t_3)$ of the operation time of the operation time of the conventional example, as shown in the time-chart of FIG. 3. Further, according to the present invention, the operation time can be allowed to be twice as long as the period $t_0$ of the rotational signal, unlike the conventional example. Consequently, the operational processing according to the present invention can cope with a high engine speed which is twice or more as high as that of the conventional example.

Further, since the operational processing for the moderately-changing correction quantities for the fuel quantity as well as ignition timing which do not require high-speed real time processing, and operational processing for the idle rotational speed control, the EGR control, fault diagnosis, and the like, are performed by one microcomputer, the high-speed control for the fuel injection and ignition is hardly.

Moreover, since the microcomputers used for performing control are provided separately from each other, running of the engine can be performed even if either one of the microcomputers gets out of order. Accordingly, the engine control apparatus according to the present invention is advantageous also in view of fail safe.

In order to cope with a high engine speed, it will do to provide a microcomputer for every cylinder.

Although the embodiment has been described in a case where the invention is applied to a 4-cylinder engine, it is needless to say that the same effects can be obtained when the invention is applied to a multi-cylinder engine such as a 6-cylinder engine, an 8 cylinder engine, etc., if the cylinders are grouped in pairs so that each pair of the cylinders are controlled by one microcomputer.

According to the present invention, as described above, microcomputers are provided each for every one of or every pair of cylinders of an engine so as to carry out real-time control of the fuel injection and ignition of each cylinder or of the each pair of the cylinders, and among the fuel and ignition control, the control of moderately-changing correction signals, the idle rotational speed control, and the EGR control are performed by a single microcomputer. Therefore, the operational time can be shortened, and can be allowed to be twice .as long as the period of the rotational signal, so that the operational processing can cope with high-speed rotation which is twice or more as high as that in the conventional example.

Further, not only the high-speed control of the fuel injection and ignition is hardly affected but also running of the engine can be performed even when either one of the microcomputers malfunctions, and the engine control apparatus according to the present invention is advantageous also that it is fail safe.

What is claimed is:

1. An engine control apparatus for electronically controlling a fuel and an ignition timing for a multicylinder 4-cycle engine comprising:
   a plurality of first control means each being provided for every one of or for every pair of cylinders in which compression and exhaust strokes are in phase;
   second control means arranged to exchange communication of correction control information with said plurality of first control means;
   said first control means having the capability of performing the following steps:
   (a) calculating a fundamental quantity of fuel injection according to a rotational signal and a load signal of said engine,
   (b) carrying out a correction operation on the fundamental quantity of fuel injection calculated in step (a) according to correction control information of said second control means, step (c) controlling a fuel injection valve on the basis of an output of step (b),
   (d) calculating an ignition timing according to said rotation signal and load signal of said engine,
   (e) carrying out correction operation onto an output obtained in step (d) on the basis of correction control information of said second control means, and a second output circuit for on/off-controlling ignition coils on the basis of the ignition timing calculated in step (e); and
   said second control means including means for calculating a quantity of correction of said fuel and a quantity of correction of said ignition timing from at least one of parameters including an engine speed, an engine load condition, an engine temperature, atmospheric pressure, and an output of an oxygen sensor whereby said plurality of first control means is capable of performing said steps at high engine speeds.

2. An engine control apparatus as claimed in claim 1, in which said second control means further controls an idle rotational speed.

3. An engine control apparatus as claimed in claim 1, in which said second control means further controls a quantity of re-circulation of an exhaust gas.

4. An engine control apparatus as claimed in claim 1, in which said second control means further controls the operation of a suction valve.

5. An engine control apparatus as claimed in claim 1, in which said engine is of a 4-cylinder type.

6. An engine control apparatus as claimed in claim 1, in which said engine is of a 6-cylinder type.

7. The engine control apparatus as claimed in claim 1, wherein said rotational signal and said load signal are provided by sensors.

8. The engine control apparatus of claim 1, wherein said plurality of first control means is capable of performing said steps at engine speeds greater than 6,000 rpm.

* * * * *